June 9, 1942.  G. F. HUBSCHMID  2,285,975
SOUND PICKUP FOR SOUND FILM PROJECTORS
Filed Nov. 12, 1940.
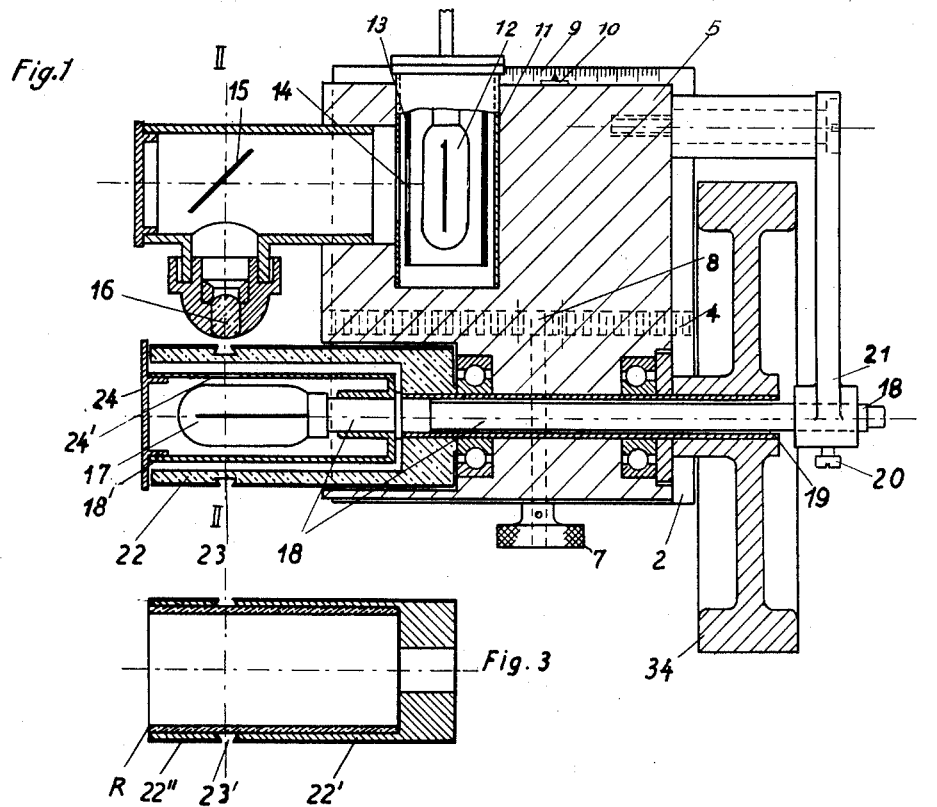
Inventor,
Gottfried F. Hubschmid, Patented June 9, 1942

2,285,975

UNITED STATES PATENT OFFICE 2,285,975

SOUND PICKUP FOR SOUND FILM PROJECTORS

Gottfried F. Hubschmid, Reute in Appenzell, Inner Rhodes, Switzerland

Application November 12, 1940, Serial No. 365,382
In Switzerland November 18, 1939

7 Claims. (Cl. 179—100.3)

My invention relates to improvements in sound pickups for sound films; and the objects of my improvement are, first, to positively prevent any dust particles from reaching the photocell; second, to provide film roller facilities for eliminating any slippage of the film over the turnback roller; third, to afford means for collecting the dust brought along by the film and for easily removing same; and fourth, to accord facilities for displacing the pickup aggregate at right angles to the film in order to permit of lighting any sound track of a film strip.

I attain these and related objects by the sound reproducer or pickup shown in the accompanying drawing, in which—

Fig. 1 is a vertical longitudinal section of the pickup on the line I—I of Fig. 2, seen in the direction of the arrow A;

Fig. 2, a side view and section on the line II—II of Fig. 1, and

Fig. 3, a section of a second form of film turnback roller.

A shifter plate 2 is screwed fast to the projector 1 and is provided with guides 3 and a rack 4. In new type projectors the plate 2 may be omitted, provided the guides 3 and the rack 4 are existing. The block 5 has counter guides 6 and a pinion 8 which is actuated by the knob 7 and engages the rack 4. This block 5, therefore, may be slid into and onto the plate 2 and adjusted thereon by means of the pinion 8. The scale 9, which is mounted upon the plate 2, and the pointer 10, which is mounted upon the block 5, serve for the visual demarcation of the block position. The setting for the various sizes of film may be facilitated by special marks. A source of light 12, e. g. a filament lamp, is plugged into the vertical bore 11 of the block 5. The lamp socket 13 has a slot 14 through which the light passes onto the mirror 15, from which it is thrown through the objective lens set 16 onto the photo-cell 17.

The base cap 18 of the latter is plugged into the hollow rotary shaft 19 and is secured against rotation therein by means of the set screw 20 in the guide arm 21, which latter is secured to the block 5. A drum 22, which is the film turnback roller, is secured to the rotary shaft 19 and possesses a circumferential groove 23 lying in the path of the light under the sound track of the film. This groove or lighting gap 23 extends to a certain depth, its bottom is bridged by a transparent material, and it has a dovetail form in order to prevent the light from being refracted from its sides.

In Figs. 1 and 2 the roller 22 is made of a transparent material, but its outer or film contact surface has been rendered opaque. In Fig. 3 a second form of invention is shown, in which the two opaque rollers 22' and 22" are united to form the lighting gap 23 by means of the transparent tube R.

In earlier forms of sound pickups this groove or lighting gap 23 was an open passage through the turnback roller 22, and any dust carried along by the film could pass through it and be deposited on the photocell and thus impair the clearness of sound reproduction. My invention positively eliminates this disadvantage by having the dust collect on the bottom of the groove from where it easily may be removed, e. g. by brushing. A further advantage of my invention is the fact that any scratching of the film or of the transparent material bridging the gap is prevented, since this material does not contact the film.

The width of the lighting gap 23 depends on the width of the sound track of the film. It is obvious that further practical forms of invention are possible, but the essential points of my invention are: the transparent material bridging the bottom of the lighting gap 23 does not touch the film, and the latter is supported over its entire width—with the exception of the gap—on the turnback roller 22.

The tube 18' is secured to the base cap 18 and is provided with a stop lens aperture 24' and a protective cover 24 which is extended beyond the tube 18' and also slightly beyond the surface of the roller 22 so as to serve as stop for the film passing over the latter.

Instead of disposing the photo-cell 17 directly within the roller 22, it also may be placed outside of the rotary shaft 19. In such a case the light would be thrown through a mirror disposed within the said roller and through the said shaft 19 onto the photo-cell.

The pickup aggregate, comprising the parts 5—8 and 10—24, may be displaced from the left to the right or vice versa in the plane of the Fig. 1 or at right angles to the plane of the Fig. 2. During operation the parts 19 and 22 rotate, while the parts 17, 18, 18', 24 and 24' remain stationary. All the parts shown in Fig. 3 rotate. The said pickup aggregate may be easily exchanged in the projector.

Since the device described is secured directly to the projector, a roller train for guiding the film on the device itself is not required. The necessary film transport rollers 25 and 26 are parts of the projector itself, and only the intake and outlet rollers 27 and 28, as well as the rollers 29 and the pin 31 are additional. These additional rollers are spring supported and may swing outward in the direction of the curved arrows in Fig. 2 and suitably are provided with dampers 33. These rollers are brought as close as practical toward the rotary drum 22 in order to give the film as much circumferential grip as possible so that slippage is prevented.

The rollers 27 and 28 suitably are mounted upon one end of the cranked arms 32 which at their other ends are pivoted on the fixed pins 30 and 31. The pin 30 is provided for on any type of existing projector, while the pin 31 is additional. To adapt any projector for sound films, the only requirement is that the pin 31 be provided for and that the existing guide rollers be exchanged by the ones described.

In order to attain as smooth and as uniform a rotation as possible of the roller 22, a torque-equalizing means, e. g. a fly wheel 34, is secured to the shaft 19.

By means of the apparatus described I attain a tremorless lighting of the sound trace, a very compact aggregate which requires only little space, and a very clear sound reproduction. By correspondingly exchanging the source of light the apparatus also may be used to light film strips through the sound trace, which is of great advantage in the production of synchronized films. For the purpose of sound reception, the apparatus may be provided with a lightproof hood.

What I claim and desire to secure by Letters Patent is:

1. In sound pickups of sound film projectors the combination of photo-cell and turnback roller, comprising a stationary photo-cell having an extended base cap, a hollow rotary shaft enveloping the latter, an inner stationary drum secured to the said base cap and enveloping the said photo-cell and having a stop lens aperture, an outer rotary drum or film turnback roller secured to the said shaft and having a circumferential dovetail groove in the path of light from the film sound trace to the said photo-cell, a cover for the free ends of both said drums secured to the said inner drum, and a transparent agent bridging the bottom of the said groove.

2. The combination of photo-cell and turnback roller according to claim 1, in which the said turnback roller is made of transparent material and its film contact surface, however, has been rendered opaque.

3. The combination of photo-cell and film turnback roller according to claim 1, in which the said turnback roller comprises two separate tubes of opaque material which at their juncture form the said groove, and a transparent tube underlying and uniting the said former tubes into a single roller.

4. The combination of turnback roller and photo-cell according to claim 1, in which the top width of the said groove on the film contact surface of the said roller corresponds with the width of the film sound trace.

5. A sound pickup for sound film projectors comprising a source of light, an optical system for throwing the light onto the film sound trace, the combination of photo-cell and film turnback roller according to claim 1, a block to which all the said parts are secured, and a rack-and-pinion drive for displacing the said block relative to the projector.

6. The combination of photo-cell and film turnback roller according to claim 1, in which the said rotary shaft is provided with a torque-equalizing means.

7. In a sound film projector comprising the combination of photo-cell and film turn-back roller according to claim 1, spring-weighted roller swing arms to quieting the film running over the turnback roller and to afford the greatest possible circumferential grip of the film on the latter roller.

GOTTFRIED F. HUBSCHMID.